(12) United States Patent
Sanders et al.

(10) Patent No.: US 6,705,569 B1
(45) Date of Patent: Mar. 16, 2004

(54) AXI-SYMMETRIC MIXED COMPRESSION INLET WITH VARIABLE GEOMETRY CENTERBODY

(76) Inventors: Bobby W. Sanders, 2806 Wakefield La., Westlake, OH (US) 44145; Lois J. Weir, 1306 Lipton Ave., S.W., North Canton, OH (US) 44720

( * ) Notice: Subject to any disclaimer, the term of this patent is extended or adjusted under 35 U.S.C. 154(b) by 0 days.

(21) Appl. No.: 09/852,129

(22) Filed: May 9, 2001

Related U.S. Application Data

(63) Continuation of application No. 09/397,393, filed on Sep. 16, 1999, now Pat. No. 6,276,632.
(60) Provisional application No. 60/100,485, filed on Sep. 16, 1998.

(51) Int. Cl.[7] ................................................. B64B 1/24
(52) U.S. Cl. ........................................ 244/53 B; 60/224
(58) Field of Search .............................. 244/53 B, 53 R; 60/224, 226, 269, 270 R

(56) References Cited

U.S. PATENT DOCUMENTS 3,495,605 A * 2/1970 Gunnarson et al.
5,088,660 A * 2/1992 Karanian

* cited by examiner

Primary Examiner—Tien Dinh
(74) Attorney, Agent, or Firm—Caifee, Halter & Griswold LLP

(57) ABSTRACT

A mixed compression supersonic inlet system is provided which includes an external cowl, and an axisymmetric centerbody which preferably translates fore and aft. The centerbody of the inlet system is further provided with indexing segments which circumferentially rotate to provide longitudinal grooves or channels located on the outer periphery of the centerbody and which increase the effective flow area of the inlet. As the indexing segments rotate circumferentially, the channel width varies. The centerbody may also be provided with indexing segments formed of a first and second portion having hinged joints which slide forward and aft in a groove. One end of the indexing segment is hinged to the non-translating section of a translating centerbody. The indexing segments are positioned over a longitudinal channel. As the translating centerbody is translated forward, the hinges of the indexing segment slide in their respective grooves to expose the channel. As the indexing segments are moved forward and aft, the depth and length of the channel varies.

11 Claims, 16 Drawing Sheets

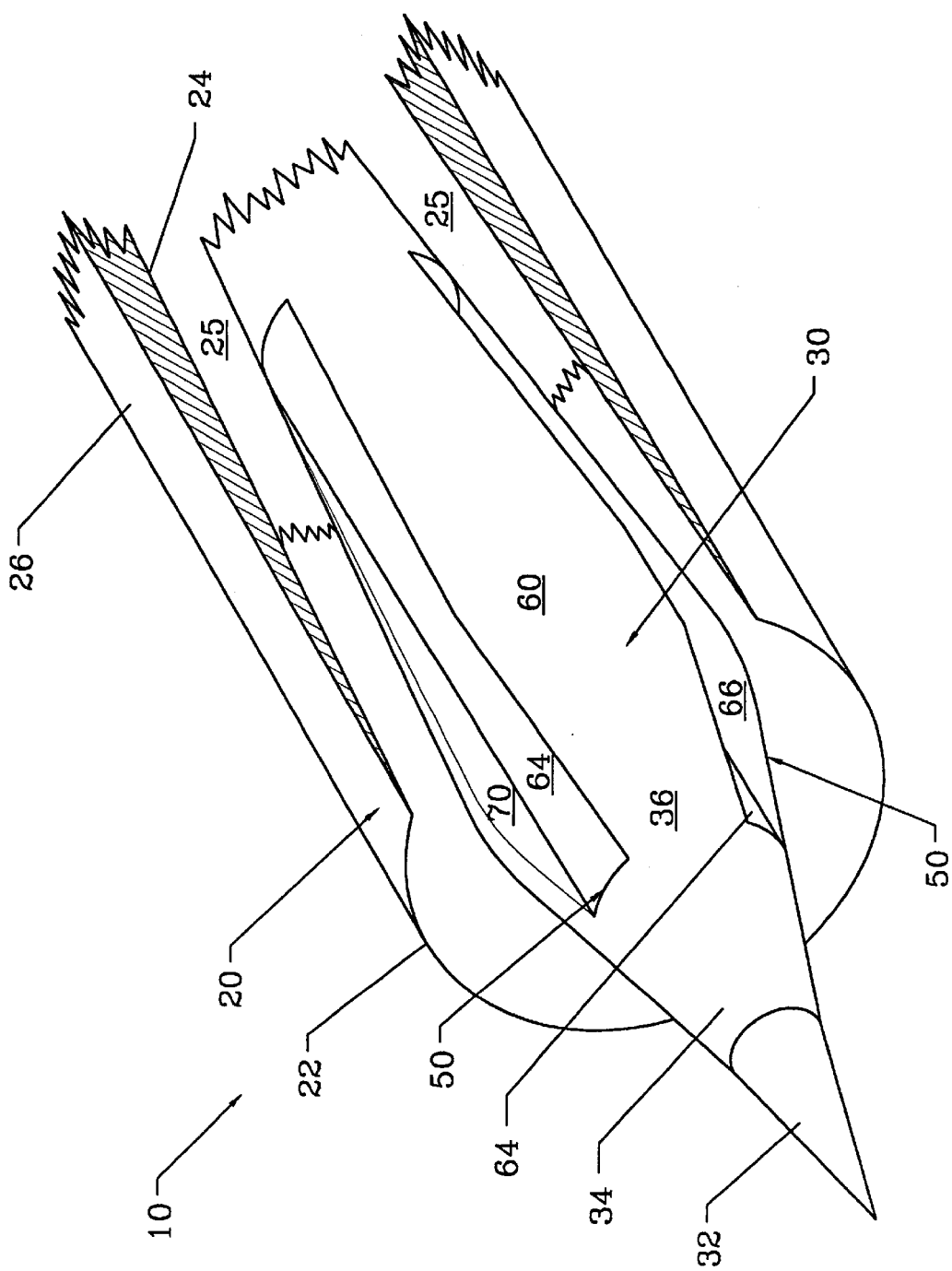
FIGURE 1.A

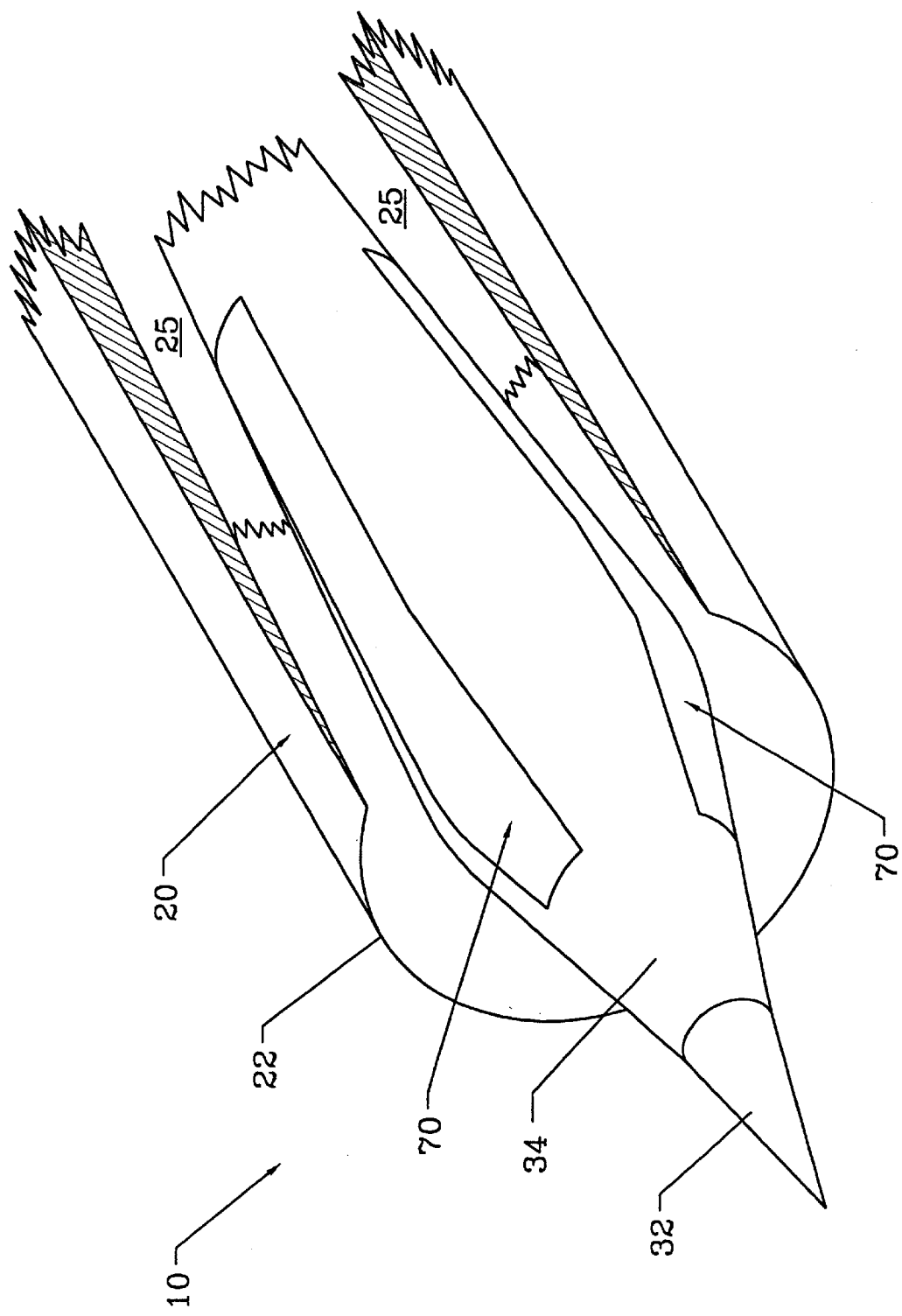
FIGURE 1.B

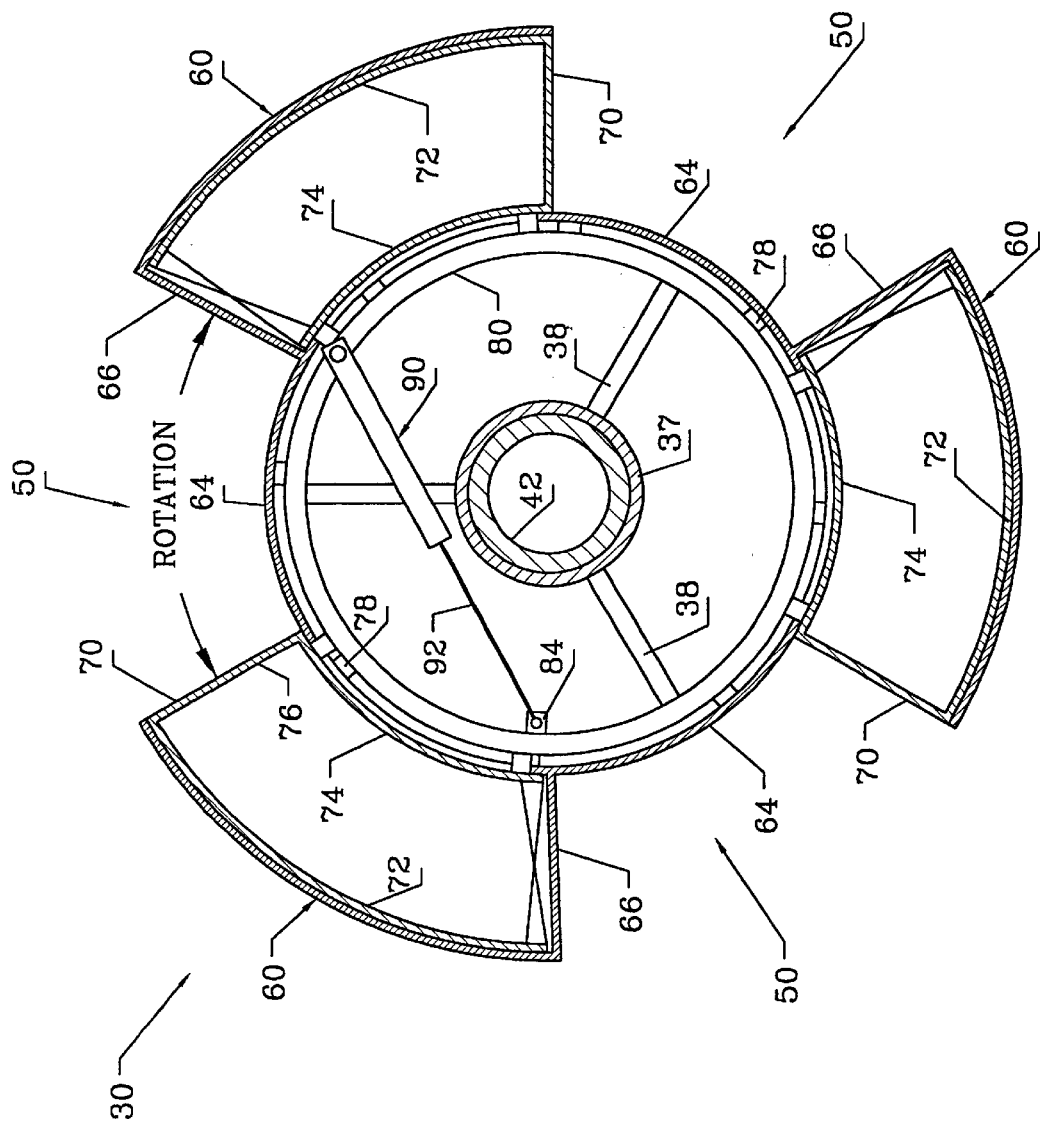
FIGURE 3.A

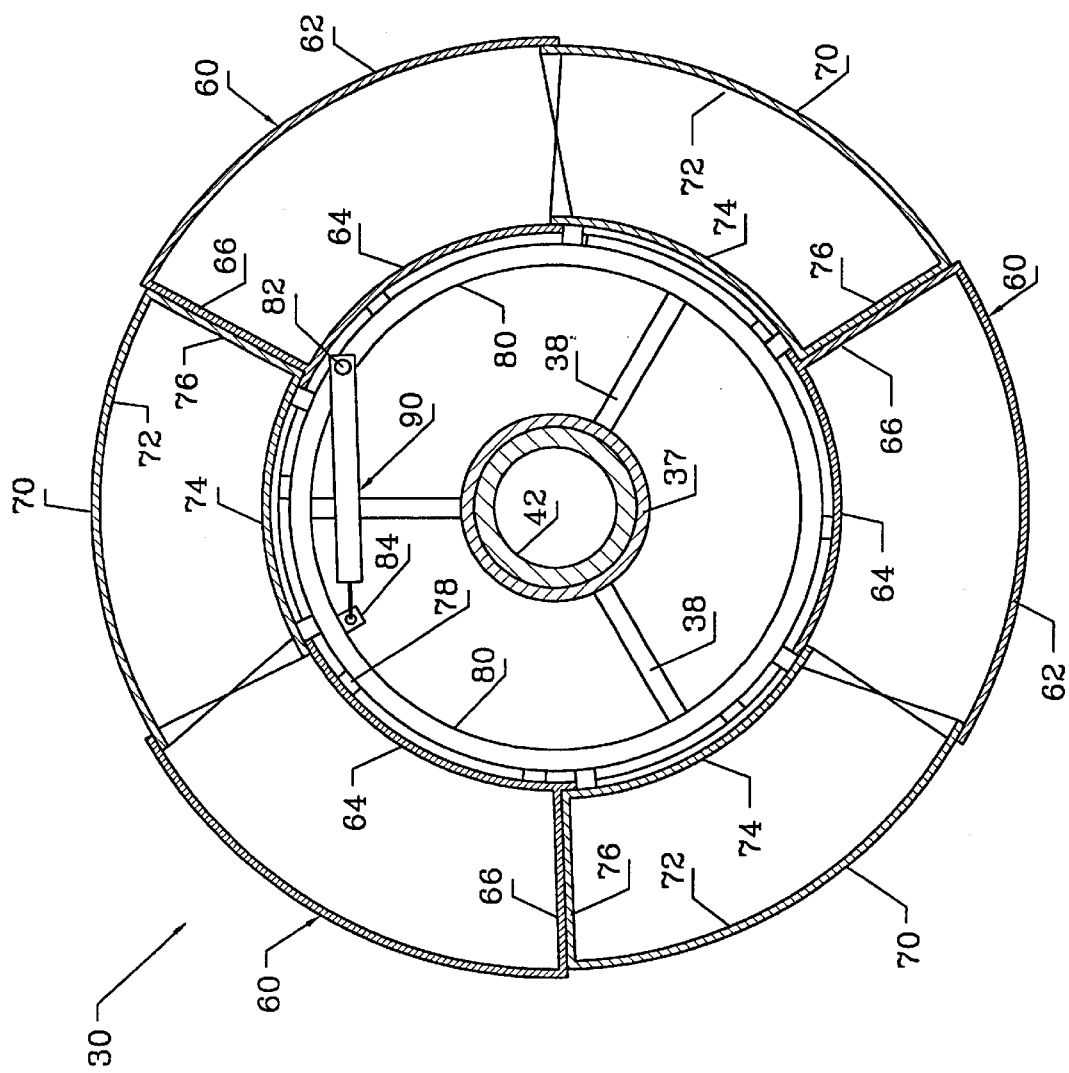
FIGURE 3.B

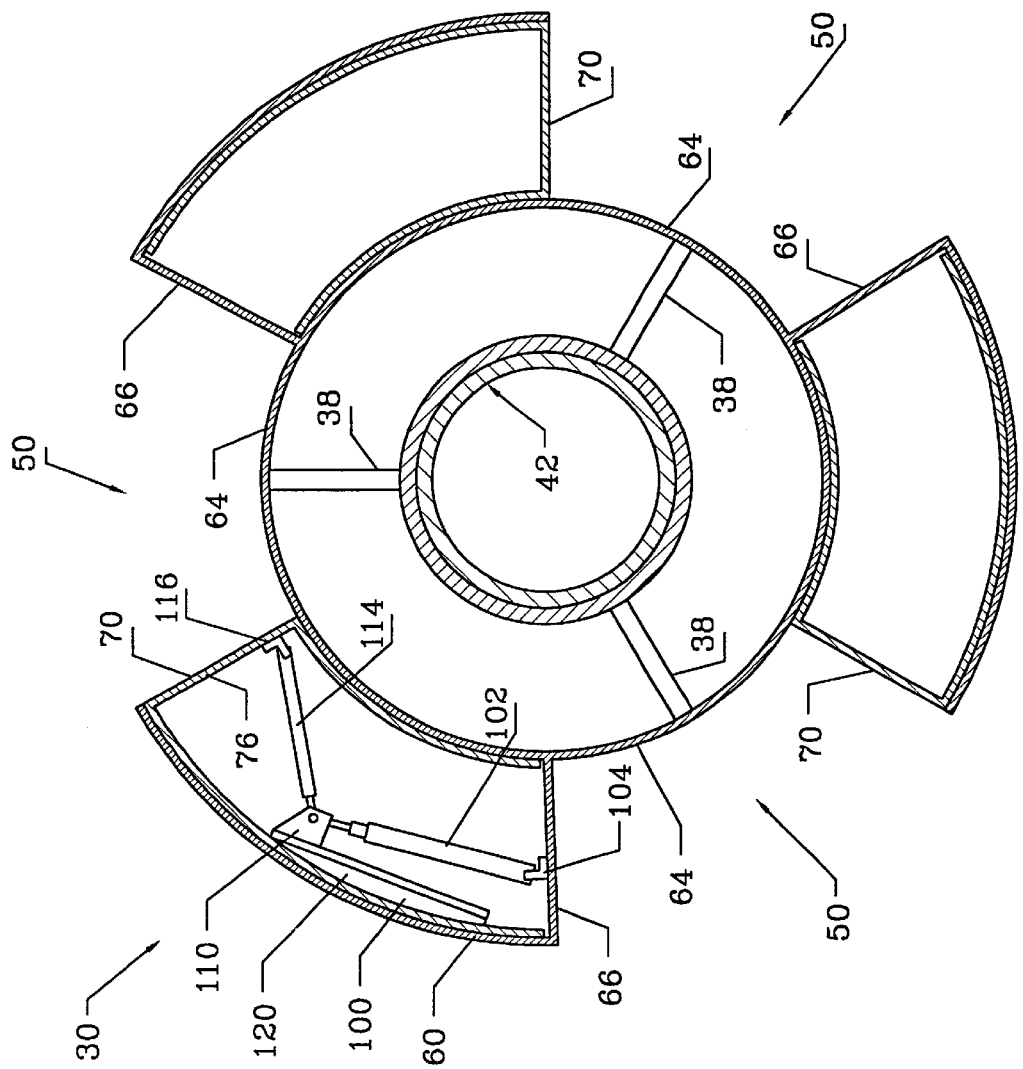
FIGURE 4.A

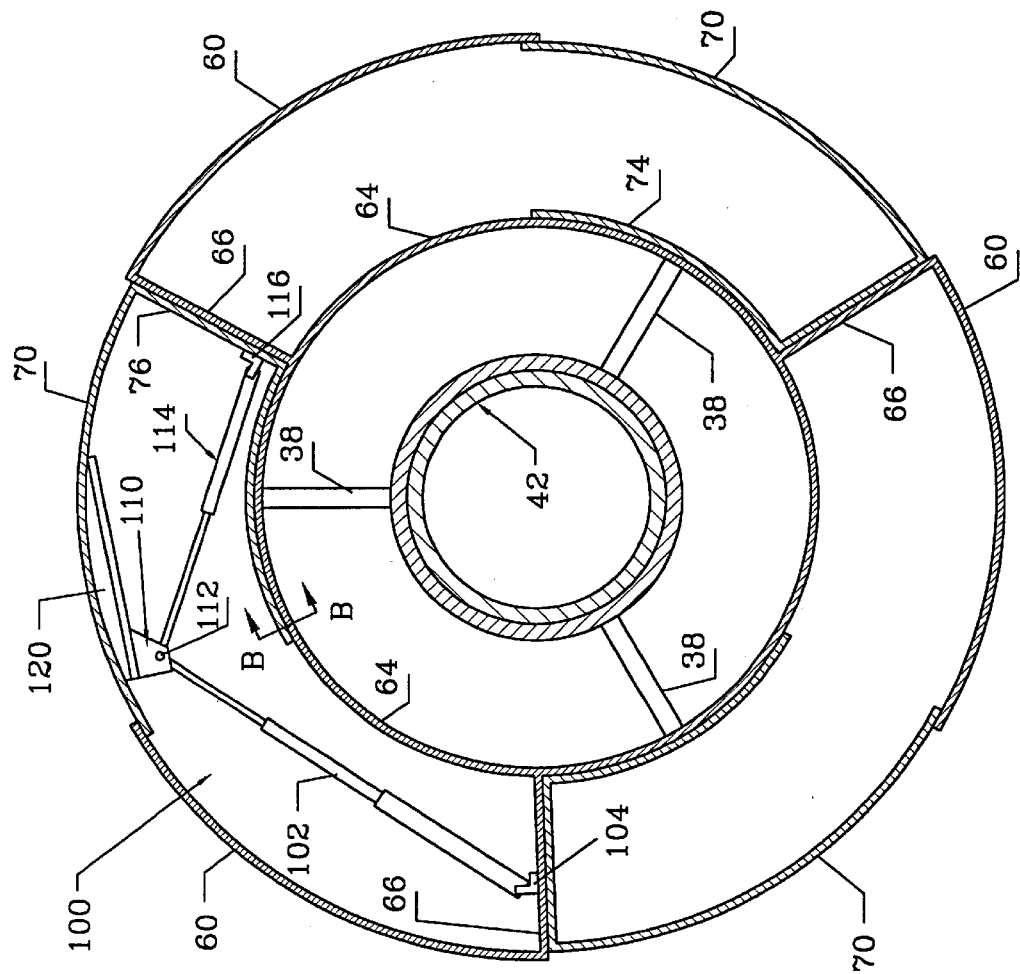
FIGURE 4.B

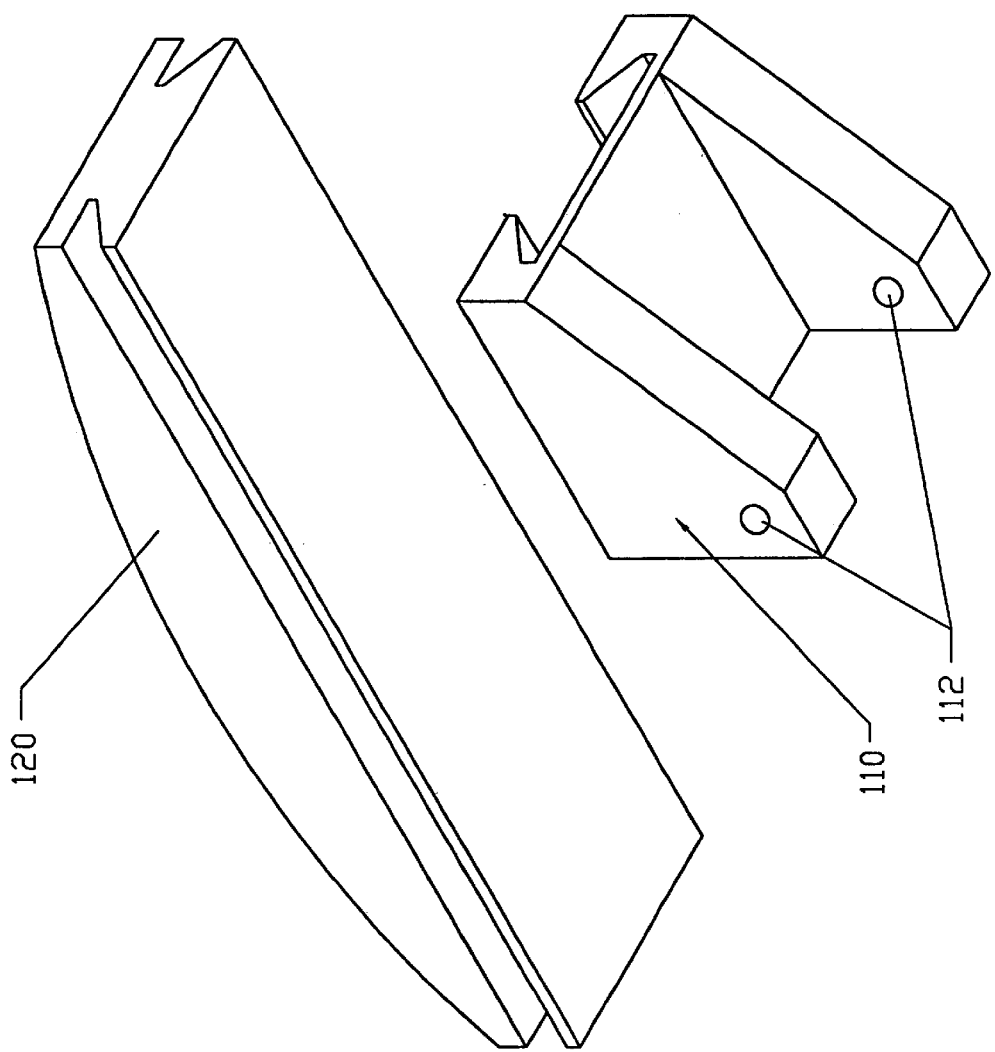
FIGURE 4.C

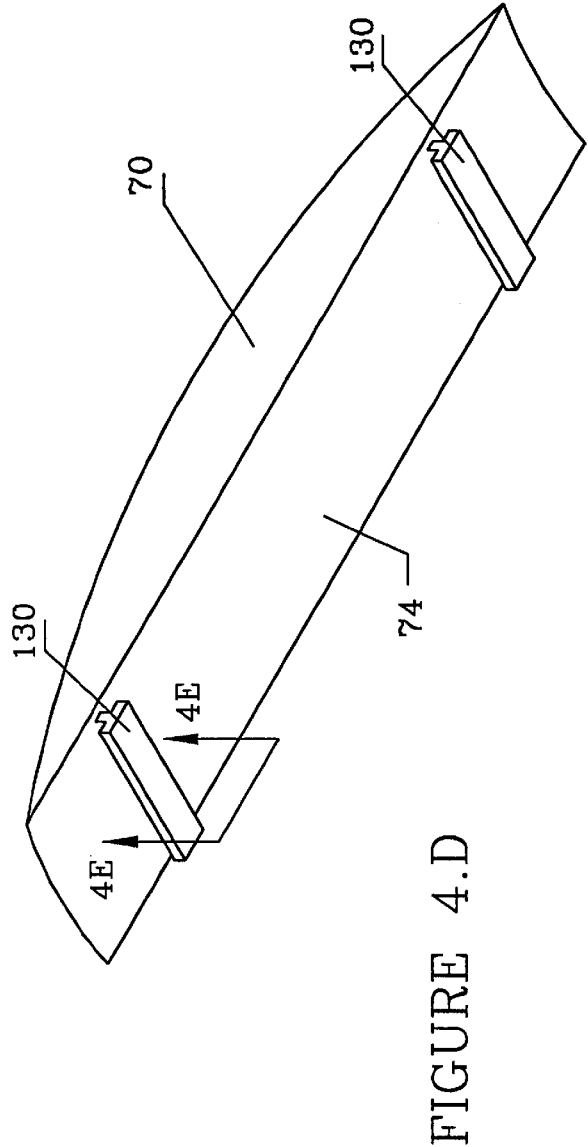
FIGURE 4.D
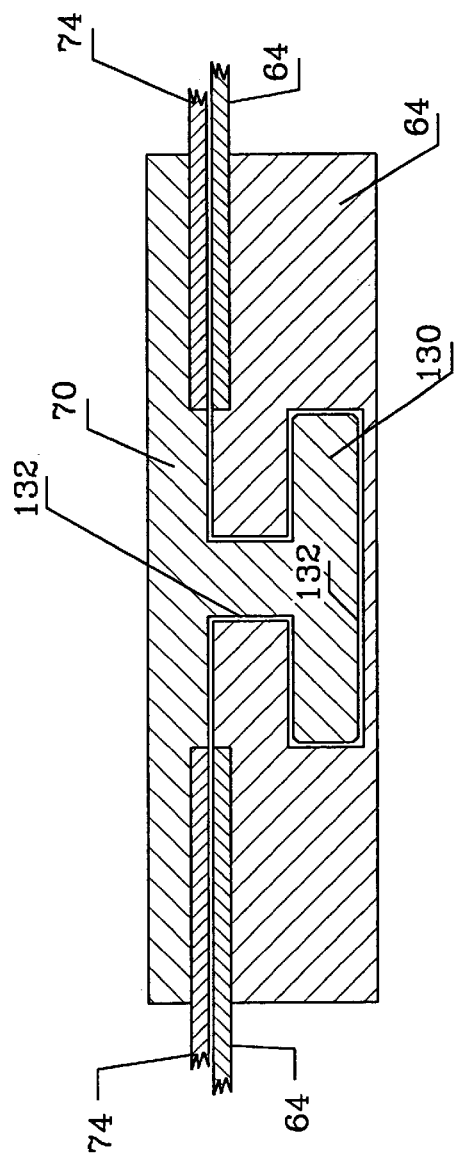
FIGURE 4.E

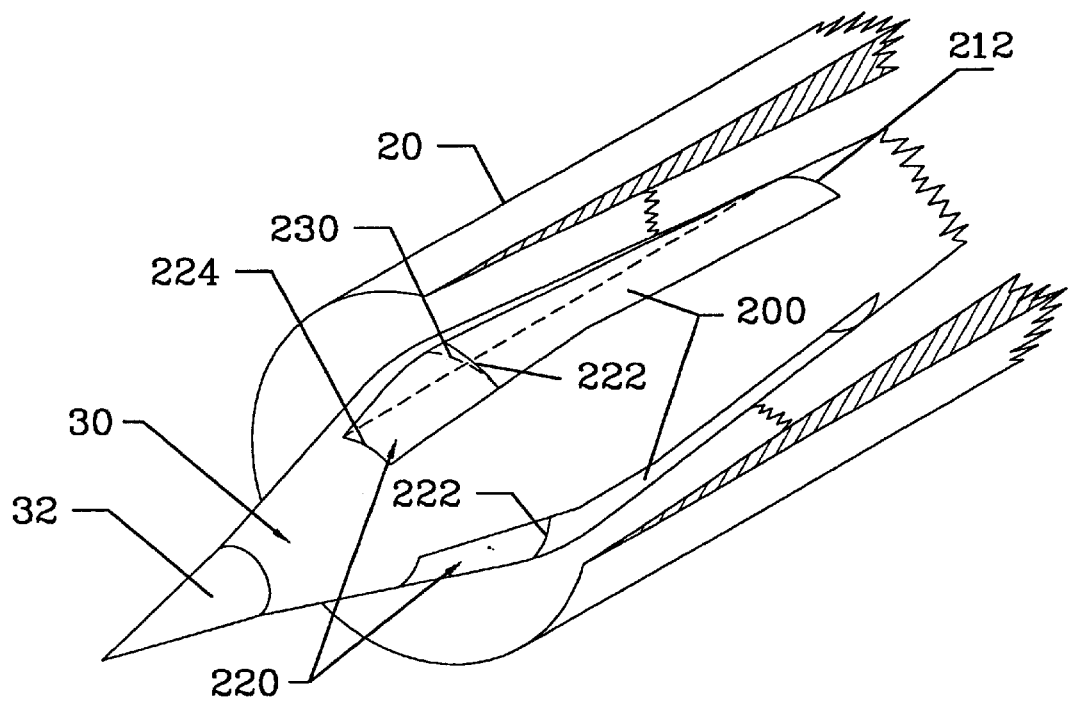
FIGURE 7.A
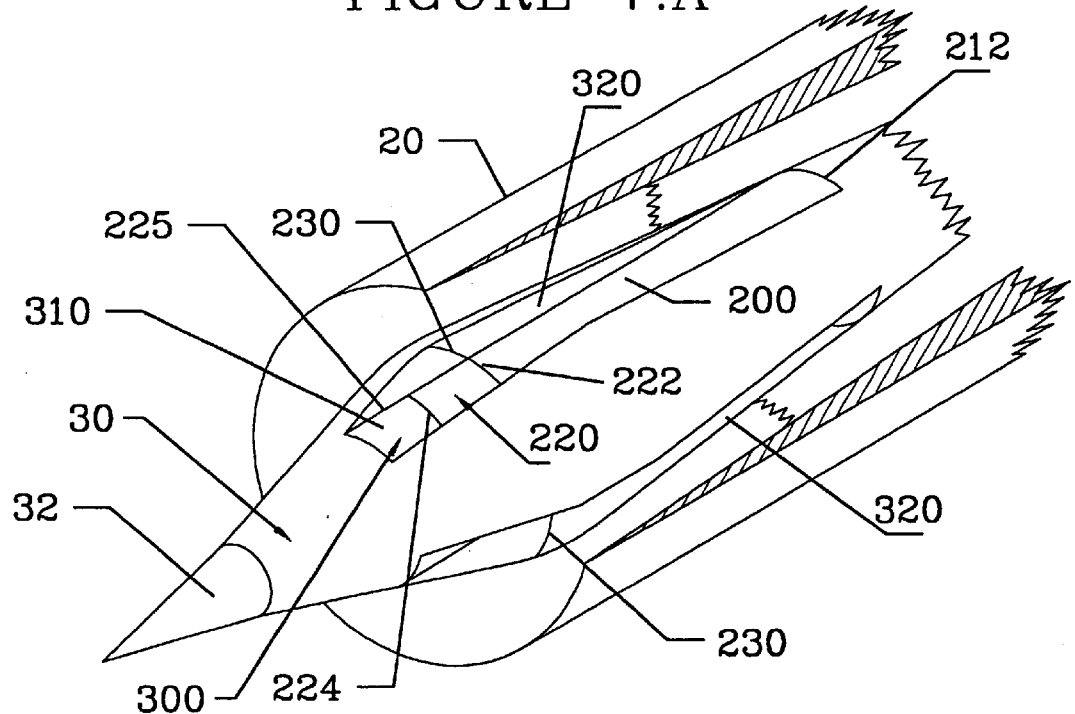
FIGURE 7.B

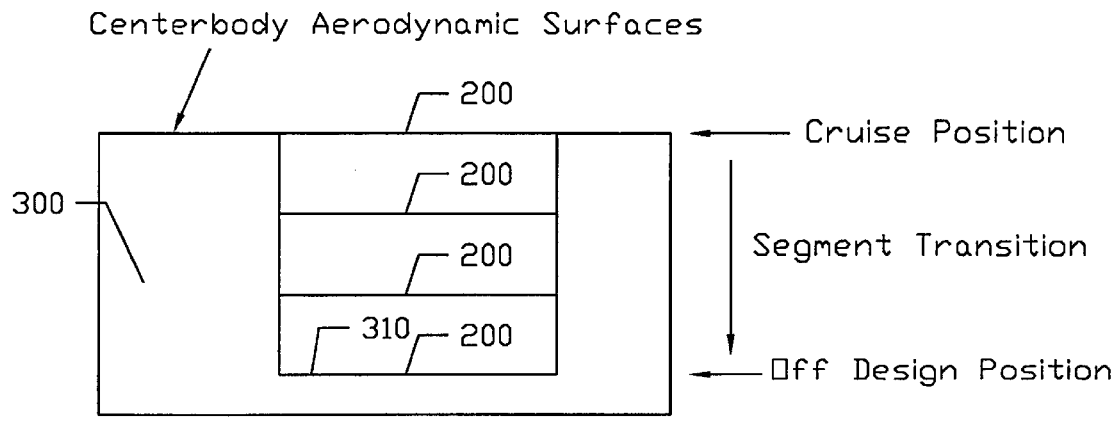
FIGURE 7.C
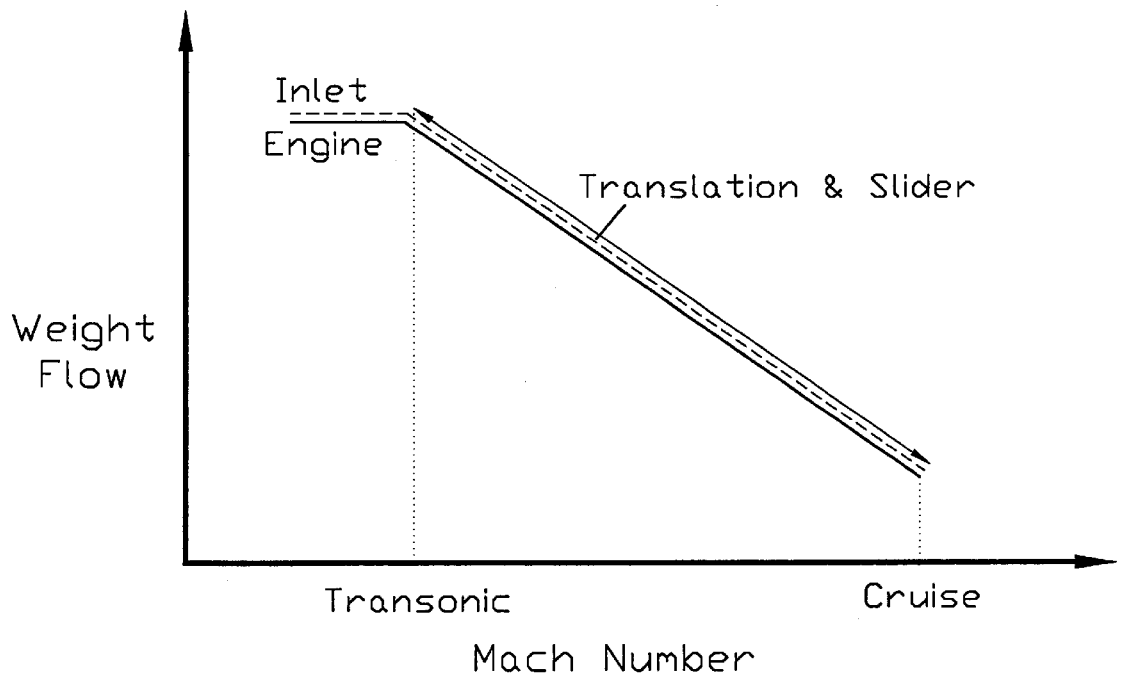
FIGURE 8

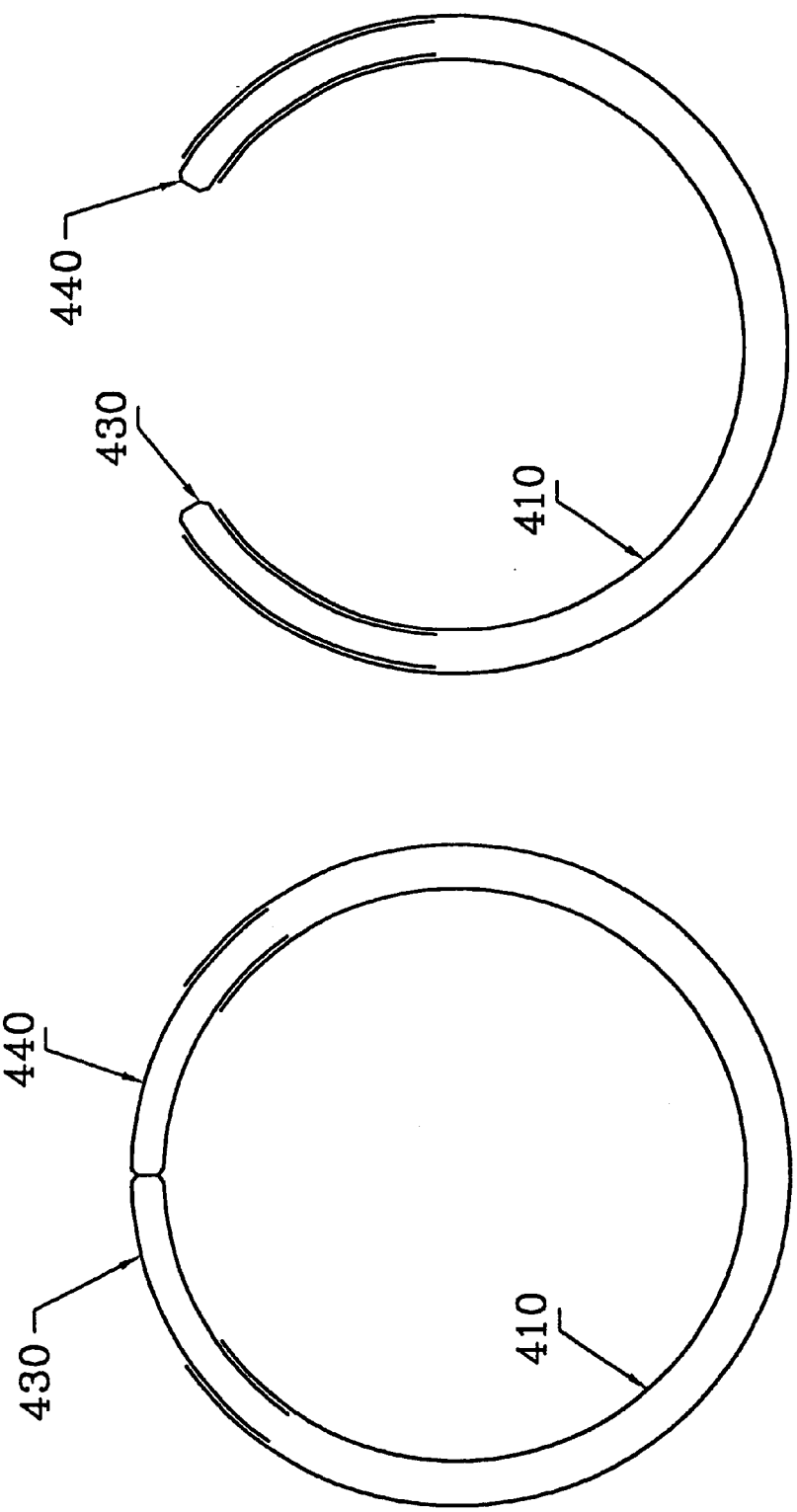

AXI-SYMMETRIC MIXED COMPRESSION INLET WITH VARIABLE GEOMETRY CENTERBODY

This application is a continuation of U.S. patent application Ser. No. 09/397,393 filed on Sep. 16, 1999, now U.S. Pat. No. 6,276,632, which claimed the benefit of U.S. provisional application Ser. No. 60/100,485 filed on Sep. 16, 1998.

FIELD OF THE INVENTION

The present invention relates to aircraft engine inlets, and more particularly, to variable area inlets for supersonic and subsonic aircraft.

BACKGROUND OF THE INVENTION

A supersonic inlet is a sub-component of an aircraft propulsion system for high speed supersonic aircraft. The supersonic inlet should be designed to efficiently decelerate the approaching high speed airflow to speeds that are compatible with efficient turbojet engine operation and to provide optimum matching of inlet and engine airflow requirements. Entrance airflow speeds to existing airbreathing engines must be subsonic; therefore, it is necessary to decelerate the airflow speed during supersonic flight. Typically, engine entrance Mach numbers for supersonic propulsion systems are 0.3 to 0.4. The inlet must reduce the velocity of the approaching airflow to these subsonic levels while maintaining a minimum of loss in freestream total pressure and while maintaining a near uniform flow profile at the engine entrance. In addition, it is essential that the inlet diffuse the air in a manner to minimize the pressure losses, cowl and additive drag, and flow distortion.

Prior art mixed compression inlets designed for supersonic cruise conditions have not been able to achieve high performance, reduced weight and mechanical complexity, as well as supply the large amount of engine airflow required for transonic conditions and takeoff conditions. The inlet must also have a wide range of operability where safety is an important consideration in order to ensure that the inlet will absorb airflow disturbances that can trigger an inlet unstart, which is a potentially dangerous condition which occurs when the normal shock moves out of the inlet duct to a position upstream of the cowl lip, and results in a rapid decrease in flight speed and engine power. Thus prior art inlets have generally traded off one or more important performance parameters at the expense of another. For example, the traditional "translating centerbody" (TCB) axisymmetric inlet has a narrow operability margin and is limited in its transonic airflow capability. Another type of mixed compression inlet known as the "variable diameter axisymmetric centerbody" (VDC) inlet is very mechanically complex and may result in high maintenance or manufacturing costs. A third type of mixed compression inlet referred to as a "two-dimensional" (2D) inlet is heavy and may impose an integration drag penalty when compared to the axisymmetric designs.

Thus it is desired to have a new and improved inlet design which provides the high performance, required transonic airflow, while maintaining an acceptable operability margin for external disturbances.

SUMMARY OF THE INVENTION

The present invention provides an inlet with a new variable geometry scheme that enables a breakthrough in axisymmetric inlet design and offers a large transonic flow capability while maintaining adequate operability margin and high performance at cruise conditions.

The invention provides in one aspect an inlet for use in an aircraft comprising an axisymetric centerbody comprising an inner annular wall and a curved exterior surface of varying height along a longitudinal axis of the centerbody. A cowl partially encloses the centerbody and forms a duct therebetween. The centerbody further includes one or more slots, with each slot having an end wall extending radially upward from the inner annular wall of the centerbody and an upper wall extending from the end wall forming an interior cavity within the slot. The centerbody additionally includes one or more segments slidably mounted upon the inner wall of the centerbody and positioned for reception into the interior cavity of an adjacent slot, wherein a longitudinal channel is formed when the segment is slidably positioned within the slot.

The invention provides in another aspect an inlet for use in an aircraft comprising a translating axisymetric centerbody having a curved exterior surface of varying height along a longitudinal axis of the centerbody, and a cowl mounted about the centerbody and forming an annular duct therein. The centerbody further includes one or more channels formed on the periphery of the centerbody, with each channel having opposed sidewalls extending longitudinally along the centerbody and a bottom wall connecting the sidewalls. The centerbody further includes one or more slidable segments for insertion into a respective channel, each of the segments having a first portion having a first end hinged to a stationary section of the inlet and a second portion rotatably connected to the first portion and slidably mounted within opposed grooves of the channel sidewall so that when the inlet centerbody translates foreward the segments slide within the grooves exposing the channels.

The invention provides in yet another aspect an inlet for use in an aircraft comprising an axisymetric centerbody having a curved exterior surface of varying height along a longitudinal axis of the centerbody and a cowl mounted about the centerbody and forming an annular duct therein. The centerbody further includes one or more channels formed on the periphery of the centerbody, with each channel having opposed sidewalls extending longitudinally along the centerbody and a bottom wall connecting the sidewalls. The centerbody further includes one or more slidable segments for insertion into a respective channel, each of the segments having a first portion having a first end hinged to a stationary section of the inlet, and a second portion rotatably connected to the first portion and slidably mounted within opposed grooves of the channel sidewall so that the channel is exposed when the segments slide within the grooves.

DESCRIPTION OF THE FIGURES

The foregoing aspects and many of the attendant advantages of this invention will become more readily appreciated as the same becomes better understood by reference to the following detailed description, when taken in conjunction with the accompanying drawings, wherein:

FIGS. 1A and 1B illustrate an isometric cut-away view of the inlet of the present invention with the indexing segments shown retracted in FIG. 1A and the indexing segments shown closed in FIG. 1B;

FIG. 3A is a cross-sectional view in the direction A—A of the inlet as shown in FIG. 2, and which shows the indexing segments rotated into the off-design Mach number configuration;

FIG. 3B is a cross-sectional view in the direction A—A of the inlet as shown in FIG. 2, and which shows the indexing segments rotated into the on-design Mach number configuration;

FIG. 4A is a cross-sectional view in the direction A—A of the inlet as shown in FIG. 2, and which shows one of the typical hydraulic actuator systems for rotating the indexing segments into the off-design Mach number configuration;

FIG. 4B is a cross-sectional view in the direction A—A of the inlet as shown in FIG. 2, and which shows one of the typical hydraulic actuator systems in which the indexing segments have been rotated into the on-design Mach number configuration;

FIG. 4C is a perspective view of the slide bar and slide components of the hydraulic actuator system of the present invention;

FIG. 4D is a perspective view of an indexing segment;

FIG. 4E is a cross-sectional view in the direction B—B of FIG. 4B illustrating the segment 70 positioned within a groove of the centerbody inner wall 64;

FIGS. 7A and 7B illustrate a perspective view of an alternative embodiment of the inlet system having sliding index segments in the closed position in FIG. 7A and the open position in FIG. 7B;

FIG. 7C is a cross-sectional view of a channel of the inlet system showing the slider segments at varying heights;

FIG. 8 illustrates engine weight flow versus Mach number for the inlet of the invention having sliding segments;

FIGS. 11A and 11B illustrate cross-sectional views of the subsonic inlet shown in FIG. 10 in which the indexing segments have been rotated into the "unrotated" and "rotated" positions, respectively.

DETAILED DESCRIPTION OF THE INVENTION

Figure 2:
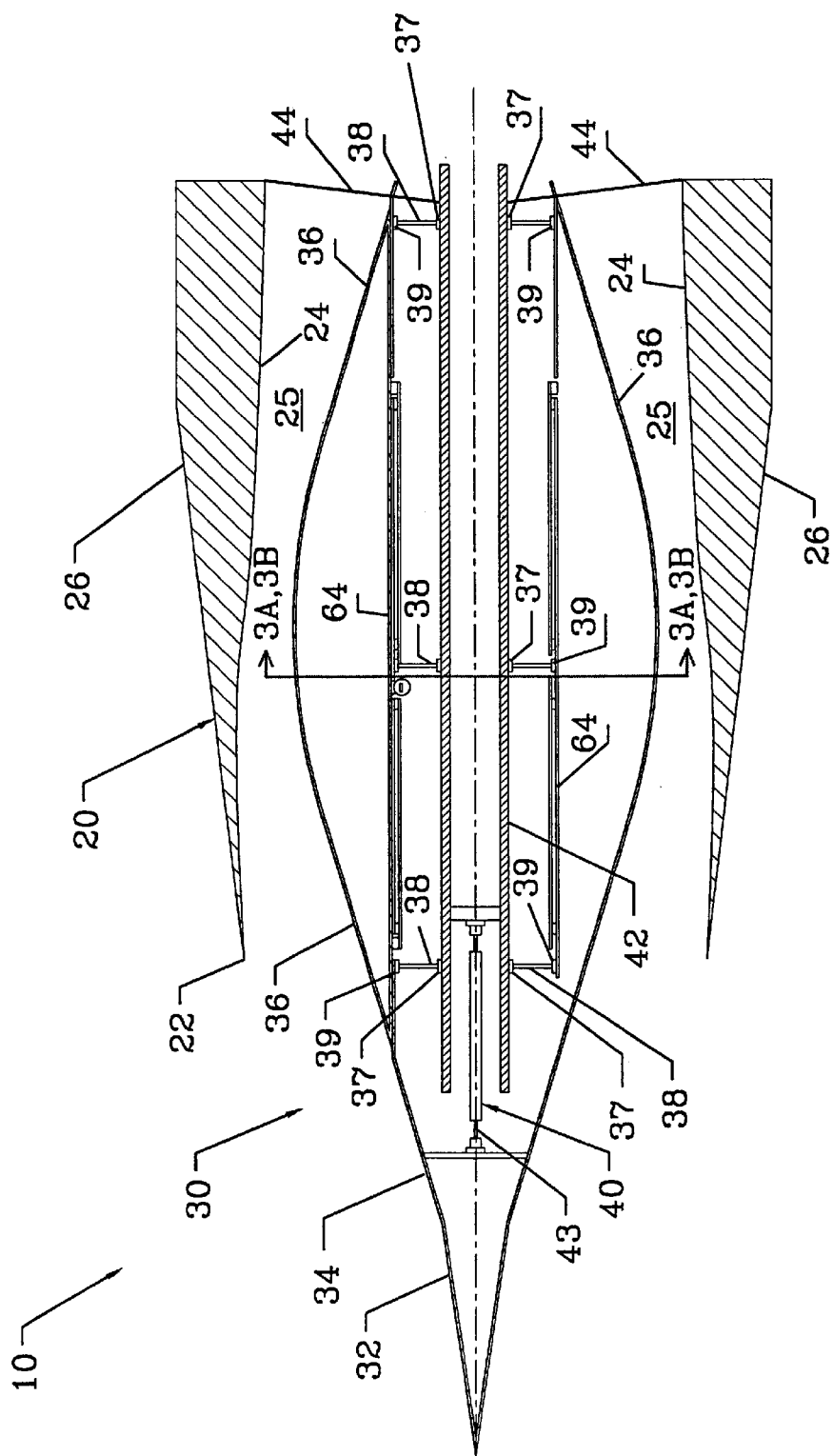
FIG. 2 is a cross-sectional view of the inlet as shown in FIG. 1.

As illustrated in FIGS. 1–7, the present invention provides a revolutionary new axi-symmetric inlet and actuation system for a supersonic propulsion system. The present invention provides a unique mixed-compression inlet with very high performance, increased safety by maintaining large operability margins, reduced weight and complexity, and a large transonic airflow capability. As shown in FIG. 1, the mixed-compression inlet system 10 of the present invention comprises an axisymmetric cowl 20 (a section of which has been cutaway for illustration purposes) that partially encloses an axisymmetric centerbody 30. The annular cowl 20 further includes a lip 22 formed at the leading edge, and inner and outer walls 24,26. The inner wall 24 of the cowl 20 together with the exterior wall 36 of the centerbody 30 form an annular duct 38 of varying cross-sectional area. The cross sectional area of the duct 38 is preferably sized for isentropic compression to the inlet throat. While the invention as described may be utilized with any type of mixed compression inlet, it is preferred for supersonic cruise applications that the aerodynamic design of the inlet 10 employ a moderate amount of internal supersonic compression in the range of about 40–60 percent. Thus it is preferred for supersonic cruise applications that the supersonic compression system of the inlet have a canceled shock at the inlet shoulder with distributed internal compression similar to a 60–40 mixed compression inlet in order to achieve the necessary on-design performance, operability, and required engine airflow at transonic conditions.

The centerbody 30 further comprises a cone shaped nose portion 32 and a contoured body section 34 which has been shaped in order to provide a desired area ratio profile for a given application. The centerbody 30 may be stationary, although it is preferred that the centerbody 30 be capable of translating fore arid aft upon demand. FIG. 2 illustrates a hydraulic actuation system 40 that may be used to translate the entire centerbody 30 fore and aft. The centerbody actuation system 40 is preferably mounted within a hollow support tube 42 of the centerbody 30. The hollow support tube 42 is affixed to the cowl 20 via support struts 44, and is preferably hollow to allow centerbody bleed to be ducted to the centerbody support struts that provide a passageway for the bleed to exit overboard (not shown). The inlet centerbody 30 is affixed to slidable support struts 38. A first end 39 of the support struts are affixed to the interior of the inlet centerbody 30, while a second end 37 has an annular flange which is in sliding engagement with the support tube 42. Thus when it is desired to translate the entire centerbody 30 foreword relative to the stationary cowl 20, the actuator 40 is actuated, resulting in linkage arm 43 which is connected to the internal nose portion of the centerbody to be translated forward in desired increments. As the centerbody translates forward, the annular flanges 37 of the support struts 38 slide forward upon the support tube 42 until the linkage arm is fully extended. Thus the centerbody 30 may translate a distance X as referenced in FIG. 2. It should be readily apparent to those skilled in the art that other actuation systems may be utilized to translate the centerbody 30 fore and aft, and that the invention is not limited to the above description.

As shown in FIGS. 1A and 1B, the centerbody 30 further comprises one or more indexing grooves or channels 50 that provide increased airflow area through the inlet duct 38. These grooves or channels 50 are located on the outer periphery of the centerbody 30 with the longitudinal axis of the channels 50 aligned with the longitudinal axis of the centerbody. FIGS. 1A and 3A illustrate the channels in a fully open position and FIGS. 1B and 3B illustrate the channels 50 in a fully closed position. As shown in the FIGS. and particularly 3A, three equally spaced channels are shown for illustrative purposes, although one or more channels would work for the invention. Although not shown in the FIGS., fences could be added along the upper edge of the flow channel to prevent airflow migration from the original centerbody surface over into the airflow channels 50.

The centerbody 30 further comprises one or more stationary arcuate slots 60 having an outer or upper curved wall 62 which is flush with the outer surface of the centerbody 36, and an inner annular wall 64. Although the floor or inner wall 64 of the opened channel 50 is shown in the FIG. 1A as a planar surface, this surface could be longitudinally contoured (e.g., arc or sine wave) to provide a smoother transitioning from the original centerbody surface 34 than the abrupt turn at the entrance to the channel 50 that is indicated in the figures. Each arcuate slot 60 further includes an end wall 66 joining the outer and inner walls 62,64 with an open end 64 opposite the end wall 66. The arcuate slot 60 has an arcuate shaped interior cavity aligned to receive a mating arcuate segment 70 therein. The arcuate segment 70 includes curved upper and lower walls 72,74 joined by end wall 76. As explained further below, the arcuate segments 70 may be actuated into the "off design" or "open" position as shown in FIG. 3A from the "design" position or closed position as shown in FIG. 3B. The arcuate segments 70 are affixed to a rotatable ring 80, which is contained within and mounted to the inner wall 64. The segments 70 are attached by tabs 78 to the ring 80, wherein the tabs 78 are positioned within grooves (not shown) of the inner wall 76 such that when the ring 80 rotates, the segments 70 rotate in kind. When the arcuate segments 70 are actuated or rotated towards the open position, the indexing channels are formed by end walls 66 of arcuate slots 60, inner wall 64 and end walls 76 of arcuate segments 70. Thus the arcuate segments 70 may be indexed into position as desired in order to control the width of the channel 50 and hence the additional cross sectional area of the duct 38. Although the shape of the segment 70 and slot 60 have been described above as preferably arcuate, the invention is not limited to this particular shape, as virtually any shape would work for the invention.

FIGS. 3A through 4D present actuation systems for use in precisely positioning or articulating the centerbody segments 70 into the slots 60 in order to form the channel 50 for design and off-design flight configurations. The off-design centerbody configuration is shown in FIG. 3A, and the on design centerbody configuration is shown in FIG. 3B. As shown in the figures, a simple mechanical hydraulic actuator 90 is used to rotate inner ring 80. The hydraulic cylinder is attached by a bracket 82 to the fixed centerbody hardware inner wall 64 and to the rotating inner ring 80 by tabs 84. An extension 92 of the actuator 90 causes rotation of the inner ring 80 which in turn causes rotation of the segments 70 which results in the formation of the channels 50 for increased airflow ducting cross-sectional area. In this embodiment, only one simple linear hydraulic actuator is needed to effect rotation of all of the segments 70.

FIGS. 4A through 4E present an alternate embodiment of an actuation system 100 using a multiple cylinder drive system. In FIGS. 4A and 4B, an actuation system 100 is shown for only one indexing segment. This arrangement would be duplicated in the other segments. For this indexing segment actuation system, multiple hydraulic actuators are used to provide rotation of each segment. One of these actuators is a telescoping hydraulic cylinder 102 which has a first end which is attached to a fixed wall bracket 104 which is mounted on the end wall 66 of the slot 60. The other end of the actuator 102 is attached to a slide 110 at a common pin 112 station with a left end of another actuator 114. This actuator 114 has a second end which is secured to the interior end wall 76 of the indexing segment 70 via bracket 116. Therefore, as the actuators retract, they pull bracket 116 and consequently the indexing centerbody segment 70 toward the other fixed bracket 104. The position of the slide 110 which is slidably mounted on a slide bar 120, depends on the length of the right actuator 114. The right actuator 114 could be retracted and then the left actuator, the reverse of this sequence, or any combination of the two. When the two actuators of this system are retracted, the end result provides the configuration as shown in FIG. 4A for the off design condition. The movement of the slide 110 on the slide bar 120 is evident in a comparison of FIGS. 4A and 4B. The two actuators 102 and 114 and the slide bar/slide (110 and 120) arrangement basically allows linear actuation to be used for circumferential movement of the centerbody segments 70. This actuation scheme also provides the capability to utilize a larger diameter centerbody support tube 42 than for the system of FIG. 3. Isometrics of the slide 120 and slide bar 110 are shown in FIG. 4C. Referring back to FIG. 4B, a retaining system to hold the indexing segments 70 is not shown. However, refer to the cross-section indication B—B in the FIG. The indexing segment 70 and this cross-section (B—B) are shown in FIGS. 4D and E. In FIG. 4D, an isometric of the indexing segment 70 is shown. Located on the interior wall 74 of this segment is one or more rails 130 that makes up part of the B—B cross-section shown in FIG. 4E. This rail 130 has a flanged end which is retained within a circumferential groove 132 located in the fixed centerbody inner wall 64 to keep the segment 70 located at the same longitudinal location while allowing the segment 70 to slide within the groove 132 of the inner wall 64.

Figure 5:
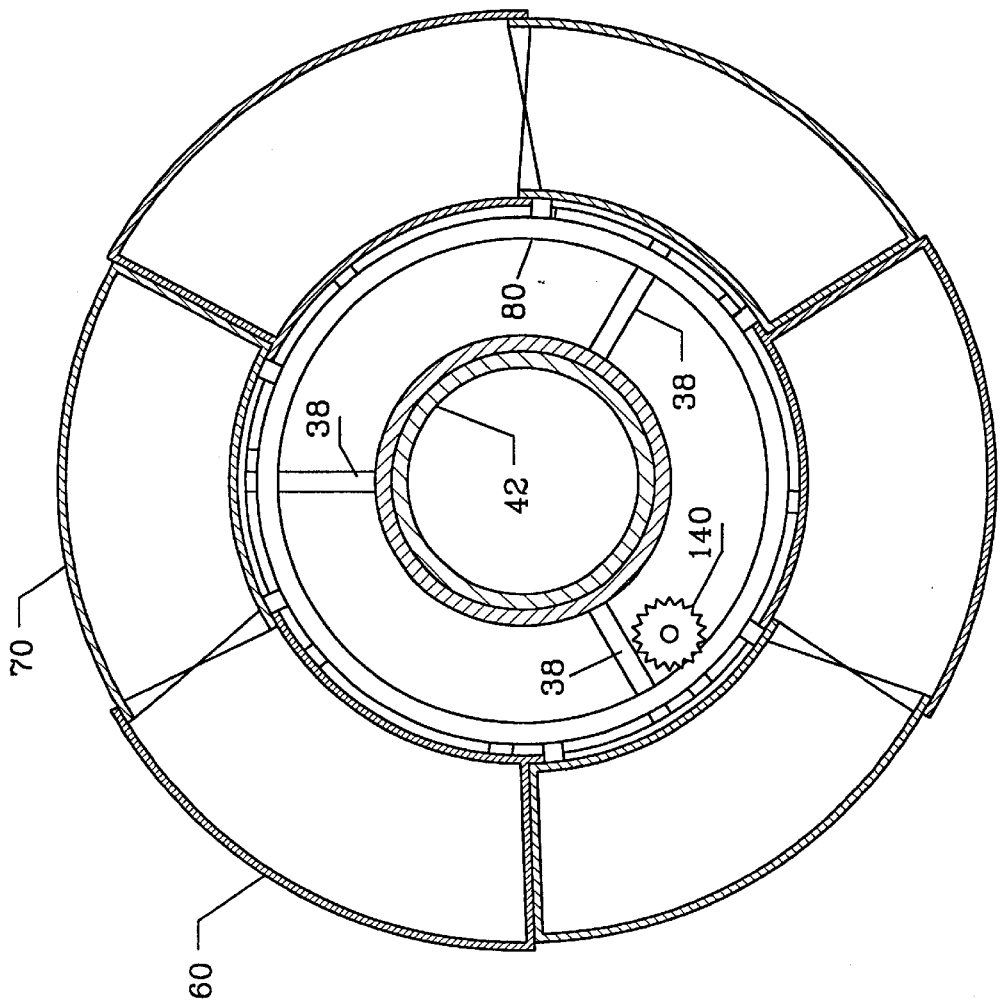
FIG. 5 is another embodiment of a drive system for actuation of the segments 70.

In yet another embodiment of the actuation system as shown in FIG. 5, the above described hydraulic actuators could be replaced by another type of drive system such as a motor (not shown) which drives one or more gears 140 to mesh with similar gear teeth cut into the inner circumference of ring 80. It is important to note that for all the above described actuation systems, the centerbody 30 may be translated fore and aft in combination with the rotation of the segments 70 into their desired position.

The operation of the inlet system can now be described. At takeoff conditions, the centerbody is preferably translated foreward and the centerbody segments 70 are fully rotated into their respective mating slots 60 forming the open channels, which results in an increased throat area of the inlet 10. This increased throat area is desirable at takeoff conditions and transonic flight speeds where the engine demands a large amount of airflow, as well as all unstarted inlet conditions. The centerbody segments 70 are rotated back into position in order to close off the channels at a flight speed near the starting Mach number for the inlet 10. The centerbody segments 70 remain closed (no channel) for all inlet started conditions. Once the inlet is started, the inlet centerbody 30 is translated aft for all high speed conditions and may be adjusted to help inlet/engine airflow matching for all started conditions.

Figure 6:
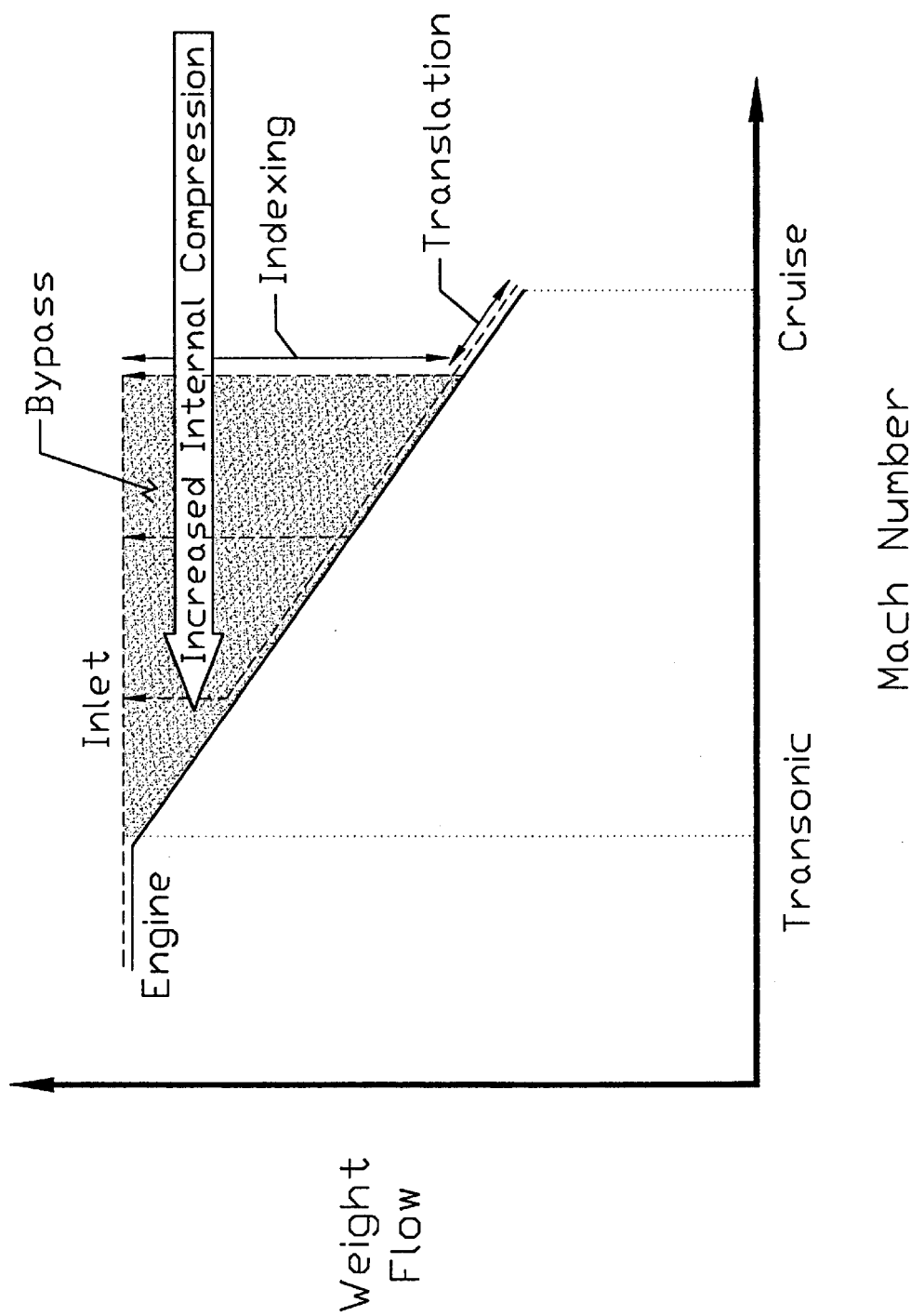
FIG. 6 illustrates engine weight flow versus Mach number for the inlet of the invention.

FIG. 6 shows typical inlet-engine airflow matching curves for the intended operation of the indexing centerbody inlet. The engine airflow schedule is denoted by the solid black line. The dashed arrows represent the inlet airflow supply schedule for the indexing centerbody configuration. Centerbody translation provides the change in airflow from cruise down to the Mach number where the centerbody is indexed to the off-design position. At this Mach number, inlet flow is abruptly increased as the segments are rotated to the open position. Any excess flow supplied by the inlet between the indexing Mach number and transonic is exhausted overboard through the inlet bypass system (denoted by the shaded area on the figure). The Mach number at which the indexing segments are rotated to the open position is determined by the amount of area variation that can be effected by centerbody translation. In general, available area variation from translation increases with increasing amounts of internal area contraction. Thus, the three vertical arrows represent three inlet configurations with increasing amounts of internal compression varying from right to left, as indicated on the figure. While it may be desirable to operate the indexing centerbody segments at positions in between the "open" and "closed" positions and more closely match the engine airflow schedule, at some point the channels 50 will become too narrow to effectively pass the desired flow. It may be desirable to operate the indexing segments 70 at two or more intermediate positions, thus increasing the flow area in a stepwise fashion.

An alternate embodiment of the inlet system 10 is presented in FIGS. 7A through 7C. This alternate variable geometry design incorporates sliding centerbody segments which gradually reveal a channel underneath as the centerbody is translated forward. This embodiment results in an improved inlet/engine airflow matching as described in more detail, below. As shown in FIG. 7A and 7B, the centerbody 30 comprises one or more sliding segments 200 which have a long slender rectangular shape although other shapes may work for the invention. It is preferred that the segments have a curved cross-sectional shape to match the curvature of the centerbody surface and a constant width W, a length L and a depth D. The segment 200 comprises a first portion 210 which has an end 212 hinged to the non-translating portion of the centerbody to allow the segment to raise and lower. The first portion 210 is connected to a first end 222 of a second portion 220 by a hinge and pin (not shown). The ends of the pin are mounted within guide grooves 230. The grooves are shaped or curved to allow the desired trajectory or path of the segments as they are slid aft and downward as the centerbody translates foreward. In addition, the second end 224 has a pinned end which is received within longitudinal grooves 225. FIG. 7A illustrates the segment 200 in the closed position wherein the first and second portions are flush with the surface 36 of the centerbody 30 such that no portion of the underlying channel 300 is revealed. As the centerbody 30 is translated forward, the end 212 of the first portion 210 of the segment 200 remains stationary (no translation) in position. Hinge pins located in the ends 222,224 of the second portion 220 are slid in the guide grooves 230,225 resulting in channel 300 being exposed as shown in FIG. 7B. Channel 300 has a floor 310 (shaded for clarity) of preferably constant width and sidewalls 320 of varying height. The crosssectional shape of the channel is preferably rectangular, although other shapes would work for the invention. FIG. 7C illustrates a cross-sectional view of the channel 300 with the segment 200 shown at varying channel heights. For example at cruise conditions, the segments 200 are positioned flush with the surface of the centerbody 30 in order to close the channels 300 as shown in FIG. 7A. As the centerbody is translated forward, the segments 200 are slid backward resulting in a decrease in channel height and an increase in exposed channel length. When the centerbody 30 is fully translated forward, the segments 200 rest upon the floor 310 of the channel 300. In summary, as the indexing segments are moved forward and aft, the depth and length of the channel varies.

FIG. 8 shows typical inlet-engine airflow matching schedules for the intended operation of the slider inlet configuration. The engine airflow schedule is denoted by the solid black curve, and the inlet airflow supply schedule is represented by the dashed line. The use of the slider segment 300 allows a continuous smooth variation in inlet airflow, allowing the inlet to match the engine demand curve more closely, thereby eliminating the requirement to bypass large amounts of excess inlet flow at Mach numbers between transonic and cruise.

In yet another embodiment of the invention, centerbody indexing segments may be utilized on other types of supersonic inlets or subsonic inlets in order to provide an increase airflow area. In addition, a engine nozzle may be provided with indexing segments in order to open an entire part of an outer surface or wall to the freestream airflow. This design allows a large increase in intake area for an inlet or exit airflow area for an exhaust nozzle as well as redirection of the airflow.

Figure 9:
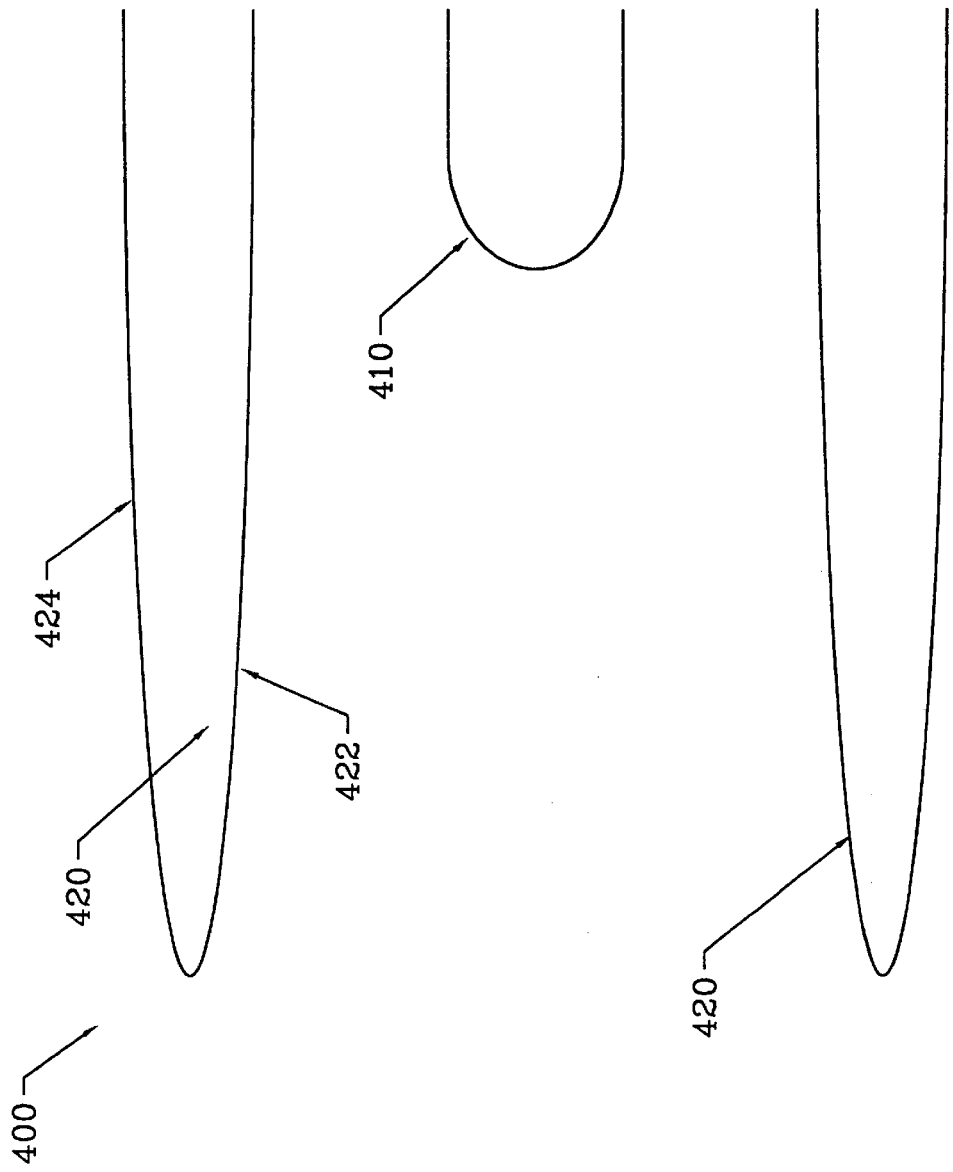
FIG. 9 is a prior art cross-sectional view of a typical subsonic inlet.
Figure 10:
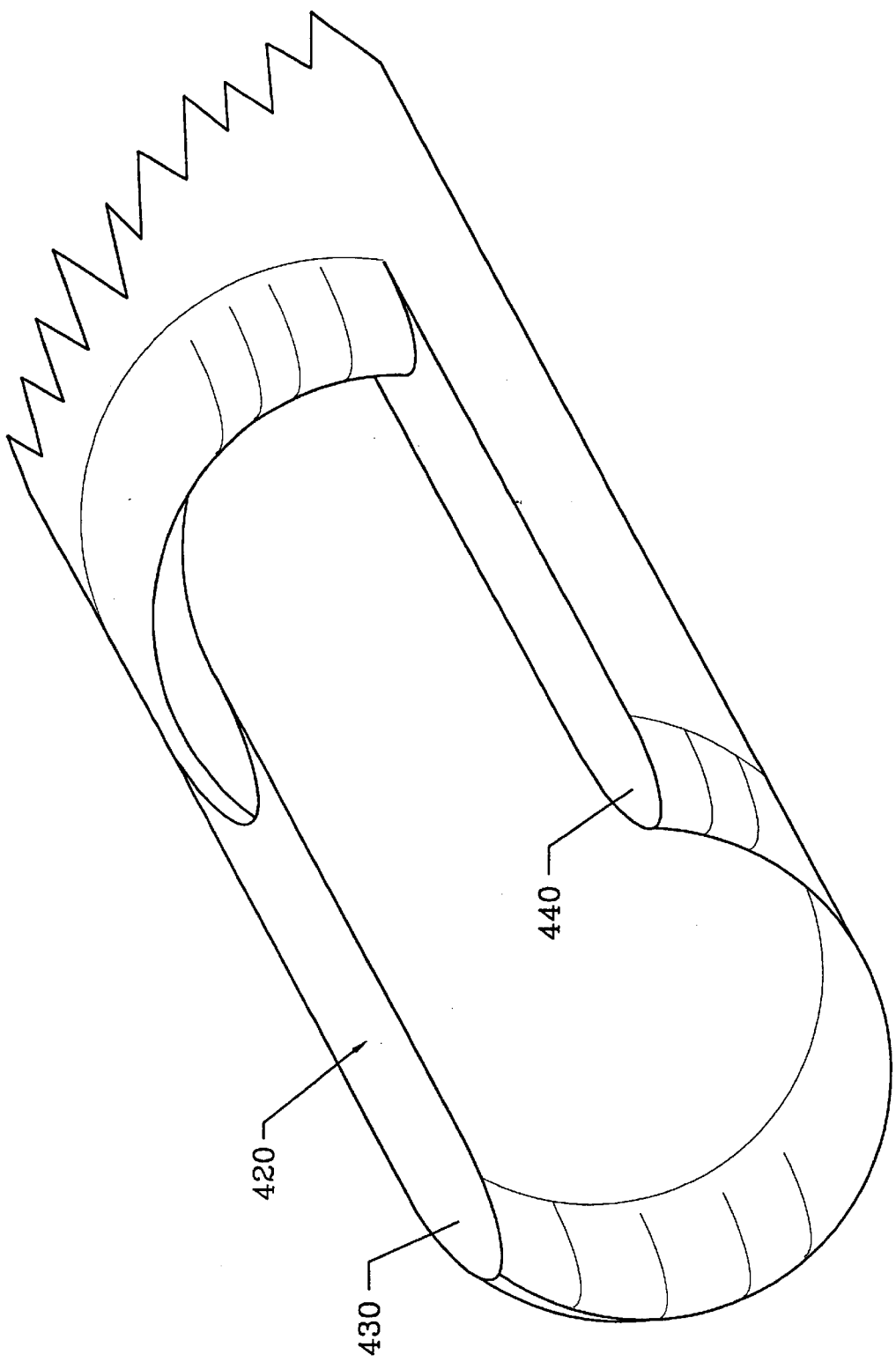
FIG. 10 is a subsonic inlet of the present invention shown with two indexing segments.

An example of an inlet for a subsonic aircraft that would utilize the indexing segments for opening an outer wall described as follows. FIG. 9 presents a cross section of a typical prior art subsonic inlet 400 that includes a centerbody 410 and an outer wall 420 with inner and external surfaces 422 and 424, respectively. FIG. 10 shows an isometric sketch of the inlet in which indexing segments 430 and 440 have been utilized to open the top portion of the inlet to the incoming airflow. This type of design will reduce foreign object damage by opening the airflow area so that it is increased in the upward direction. This tends to redirect the freestream airflow to a more downward direction and thus reduce the possibility of pulling foreign objects from the runway into the inlet. Even more important for subsonic inlet application is that separation of the airflow from the lower edge of the cowl lip is delayed to very high angles of attack. The resultant extended lower section of the inlet shields engine noise from the ground. A cross-section of the inlet with the segments 430 and 440 in an unrotated position, as well as the rotated position, is shown in FIGS. 11A and 11B, respectively. All surfaces that are exposed to the airflow are rounded to reduce the possibility of separation.

The preferred embodiments of the inlet and actuation system have been described in detail, above. However, with the present disclosure in mind it is believed that obvious alterations to the preferred embodiments, to achieve comparable features and advantages, will become apparent to those of ordinary skill in the art. For example, it is readily apparent to a person skilled in the art in this invention could adapt its use on an exhaust nozzle to provide a similar variation in nozzle airflow area.

We claim:

1. An inlet for use in an aircraft comprising:
   an axisymetric centerbody comprising an inner annular wall and a curved exterior surface of varying height along a longitudinal axis of the centerbody;
   one or more slots, with each slot having an end wall extending radially upward from said inner annular wall of said centerbody and an upper wall extending from said end wall forming an interior cavity within said slot;
   one or more segments slidably mounted upon said inner wall of said centerbody and positioned for reception into said interior cavity of an adjacent slot, wherein a longitudinal channel is formed when said segment is slidably positioned within the slot; and a cowl partially enclosed said centerbody.

2. The inlet of claim 1 wherein each of said segments is incrementally slidable from a closed position to an open position.

3. The inlet of claim 1 wherein said centerbody translates.

4. The inlet of claim 1 wherein said slots have an arcuate shaped cavity.

5. The inlet of claim 1 wherein said centerbody has a hollow support tube mounted therein; an actuator mounted within said support tube and having a first end connected to a nose of said centerbody and a second end affixed to said stationary support tube.

6. An inlet for use in an aircraft comprising:
   an axisymetric centerbody comprising an inner annular wall and a curved exterior surface of varying height along a longitudinal axis of the centerbody;
   one or more slots, with each slot having an end wall extending radially upward from said inner annual wall of said centerbody and an upper wall extending from said end wall forming an interior cavity within said slot;
   one or more segments slidably mounted upon said inner wall of said centerbody and positioned for reception into said interior cavity of an adjacent slot, wherein a longitudinal channel is formed when said segment is slidably positioned within the slot; and a cowl partially enclosed said centerbody wherein a rotatable ring is mounted within said inner wall of said centerbody, and each of said segments are connected to said rotatable ring.

7. An inlet for use in an aircraft comprising:

an axisymetric centerbody comprising an inner annular wall and a curved exterior surface of varying height along a longitudinal axis of the centerbody;

one or more slots, with each slot having an end wall extending radially upward from said inner annual wall of said centerbody and an upper wall extending from said end wall forming an interior cavity within said slot;

one or more segments slidably mounted upon said inner wall of said centerbody and positioned for reception into said interior cavity of an adjacent slot, wherein a longitudinal channel is formed when said segment is slidably positioned within the slot; and a cowl partially enclosed said centerbody wherein each of said segments has one or more rails on a bottom wall for insertion into aligned grooves on said inner wall of said centerbody.

8. An inlet for use in an aircraft comprising:

an axisymetric centerbody comprising a curved exterior surface of varying height along a longitudinal axis of the centerbody and a cowl mounted about said centerbody and forming an annular duct therein;

one or more channels formed on the periphery of said centerbody, with each channel having opposed sidewalls extending longitudinally along said centerbody and a bottom wall connecting said sidewalls; and one or more slidable segments for insertion into a respective channel, each of said segments having a first portion having a first end hinged to a stationary section of said inlet, and a second portion rotatably connected to said first portion and slidably mounted within opposed grooves of said channel sidewall so that said channel is exposed when said segments slide within said grooves.

9. An inlet use in an aircraft comprising:

a centerbody comprising one or more slots, with each slot having an end wall extending radially upward from an inner annular wall of said centerbody and an upper wall extending from said end wall forming an interior cavity within said slot;

one or more segments movable from an open position to a closed position, wherein in said open position, a portion of said one or more segments are positioned within said interior cavity of said one or more slots wherein a longitudinal channel is formed; and in said closed position said one or more segments having an upper wall forming a continuous surface with the upper wall of said centerbody so that no longitudinal channel is formed.

10. The inlet of claim 9 wherein said one or more segments may be selectively indexed in multiple positions with respect to said slots.

11. The inlet of claim 9 wherein said one or more segments are slidably positioned within said slot.

* * * * *

UNITED STATES PATENT AND TRADEMARK OFFICE
CERTIFICATE OF CORRECTION

PATENT NO. : 6,705,569 B1
DATED : March 16, 2004
INVENTOR(S) : Bobby W. Sanders, et al.

It is certified that error appears in the above-identified patent and that said Letters Patent is hereby corrected as shown below:

Column 4,
Line 13, please delete "arid" and insert -- and --

Signed and Sealed this

Thirty-first Day of August, 2004

JON W. DUDAS
*Director of the United States Patent and Trademark Office*